Patented May 2, 1933

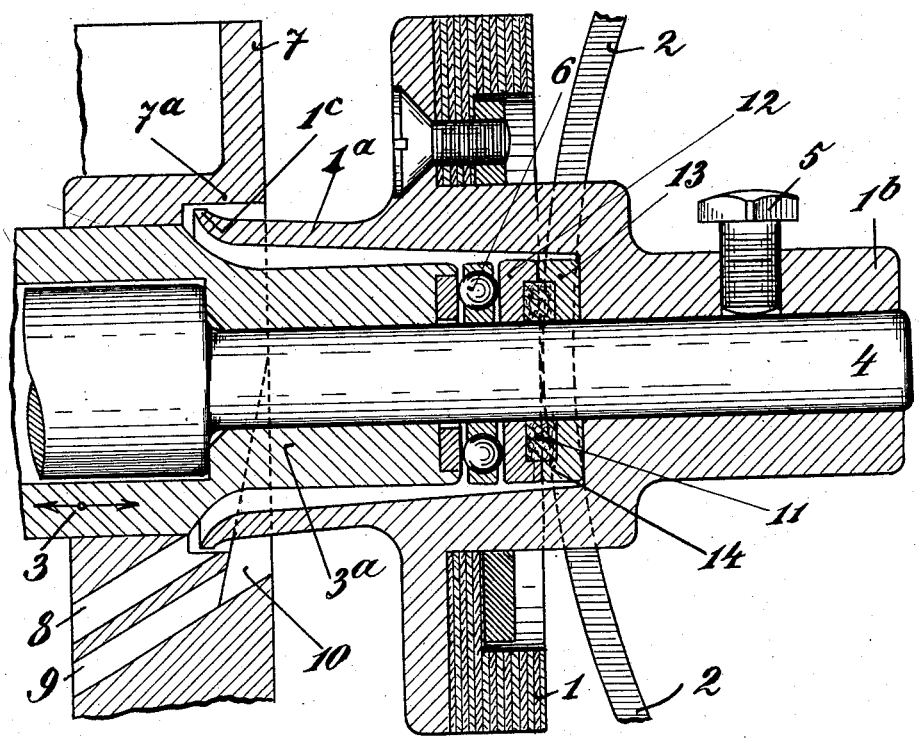

1,906,772

UNITED STATES PATENT OFFICE

WALTER SCHWEITER, OF HORGEN NEAR ZURICH, SWITZERLAND

FRICTION GEARING

Application filed May 28, 1931, Serial No. 540,713, and in Germany July 7, 1930.

My invention relates to friction gearings and has more particularly reference to means for retaining the lubricant from the friction pulleys.

In textile machines and similar machines for instance in which the revolving parts are driven by friction pulleys the gearings of which run within closed oil casings it is practically inavoidable that oil escapes during the operation from the casing along the pulley shaft and advances by centrifugal force up to the friction surface of the pulley whereby as a matter of course the entrainment is notably deteriorated. Tightening devices of various types which have been provided to avoid this drawback do not solve completely the problem of retaining the oil, or only do so in an unsatisfactory way.

Now my invention has for its object a friction gearing, more particularly intended for textile machines such as winding frames or similar machines, which is fitted with oil retaining means that in a very reliable manner prevent any soiling of the friction pulleys by escaping oil. I obtain this reliable retention of the oil primarily by the fact that the hub of the friction pulley has a hopper-like configuration, the hopper surrounding and covering the part of the driving shaft projecting beyond the gear casing in such a way that the oil which escapes along the shaft is taken up by the hopper and runs on the inner wall thereof up to the circular free edge of the hopper, this edge forming on oil thrower by which the oil is thrown off and thus prevented from advancing to the pulley.

In order to recover the oil which is retained by this oil thrower, I further provide a circular recess in the wall of the adjacent gear casing into which recess projects the edge of the hopper-like hub, the diameter of the recess being larger than the external diameter of the hopper edge only by a fraction of a millimeter. This mutual arrangement of the recess and hopper results in the fact that an oil film is formed between these two parts by the oil thrown off by centrifugal force from the hopper edge which oil film prevents further escapement of the oil. On the contrary, the oil is retained at the bottom of the recess from where it is led back to the gear casing through suitable passages.

I further provide an oil retaining member in connection with the pressure bearing of the pulley shaft within the hopper-like hub of the driven pulley, such as a ring made from felt or any other suitable material which is arranged behind the bearing. As the bearing and the appurtenant felt ring are enclosed by the hopper, the oil retained by the felt ring runs on the inner wall of the hopper up to the free edge thereof and is led back to the gear casing in the described manner.

In order that my invention may be easily understood and readily carried into effect, an embodiment of the same is illustrated by way of example in the accompanying drawing in which the parts under consideration of a friction gearing of a winding frame are illustrated in longitudinal section.

Referring to this drawing 1 denotes a friction pulley mounted on a shaft 4, and 2 denotes the appurtenant driving pulley. 3 denotes a sleeve which surrounds shaft 4 and by the axial shifting motion of which, marked by a double arrow, the pulleys 1, 2 are thrown into or out of mesh.

1$b$ denotes the hub of pulley 1 which hub is rigidly fixed to shaft 4 by a clamp screw 5. The portion 1$a$ of the hub which faces the gear casing 7 forms a hopper which projects into a circular recess 7$a$ of case 7. The diameter of this recess is only a fraction of a millimeter larger than that of the free edge of the hopper 1$a$. During the rotation of pulley 1 an oil film is formed between the free edge 1$c$ of the hopper and the recess 7$a$ by the oil thrown off from the edge by centrifugal force, this oil being retained on the bottom of recess 7$a$ and flowing back to the gear casing 7 through passages 8, 9 disposed on the lower side of recess 7$a$, as clearly shown in the drawing. I prefer to provide a semicircular enlargement 10 at the lower half of recess 7$a$ which enlargement favors the return of the oil to the passages 8, 9.

The axial pressure exerted by the shaft 4 is taken up by a pressure ball bearing 6 which abuts on the one hand against a restricted portion 3a of sleeve 3 and on the other hand against the hub portion 1b. An oil retaining ring 11 made of felt or any similar material is interposed between the ball bearing 6 and hub portion 1b and held in position by two metal rings 12, 13. Radial passages 14 of these rings serve to lead away the oil.

As clearly will be seen from the drawing, the portion 3a of sleeve 3, the ball bearing 6 and the oil retaining ring 11 with its clamp rings 12, 13 are entirely enclosed by the hopper 1a. Consequently the oil escaping by centrifugal force from the gear casing 7 at the ball bearing 6 or at the retaining ring 11 is taken up by the hopper 1a and returns along the inner wall thereof to the free edge 1c. As this edge forms an oil thrower, the oil goes over to the bottom of recess 7a from where it flows back to the gear case 7 through the passages 8, 9. The oil film formed by the diameter of recess 7a being only a little larger than the external diameter of the oil thrower 1c reliably prevents the oil from escaping from the recess 7a.

What I claim and desire to secure by Letters Patent is:—

In a textile machine, a friction gear unit comprising a gear casing, a gear shaft mounted therein and projecting therefrom, a friction pulley on said projecting shaft portion, the hub of said pulley forming a hopper the opening of which is turned toward said casing, a pressure bearing for said shaft disposed on the projecting portion thereof, and an oil retaining ring in front of said bearing, said hopper enclosing said projecting shaft portion, bearing, and oil retaining ring, an outer circular recess in the wall of said casing enclosing the free edge of said hopper, and a passage leading from said recess to the interior of said casing.

The foregoing specification signed at Zurich, Switzerland, this 16th day of May, 1931.

WALTER SCHWEITER.